US012360726B1

(12) United States Patent
Chen et al.

(10) Patent No.: US 12,360,726 B1
(45) Date of Patent: Jul. 15, 2025

(54) PLATFORM AND SEE-THROUGH DISPLAY HAVING LENS DISPLAYING CONTENT ON FRONT AND BACK SIDES

(71) Applicant: LIQXTAL TECHNOLOGY INC., Tainan (TW)

(72) Inventors: Hung-Shan Chen, Tainan (TW); Chia-Ming Chang, Tainan (TW); Ming-Syuan Chen, Tainan (TW); Guo-Lin Hu, Tainan (TW)

(73) Assignee: LIQXTAL TECHNOLOGY INC., Tainan (TW)

( * ) Notice: Subject to any disclaimer, the term of this patent is extended or adjusted under 35 U.S.C. 154(b) by 0 days.

(21) Appl. No.: 18/605,844

(22) Filed: Mar. 15, 2024

(51) Int. Cl.
  *G06F 3/14* (2006.01)
  *G02B 27/01* (2006.01)
  *G09G 3/00* (2006.01)

(52) U.S. Cl.
  CPC ....... *G06F 3/1454* (2013.01); *G02B 27/0101* (2013.01); *G09G 3/001* (2013.01); *G09G 2354/00* (2013.01)

(58) Field of Classification Search
  CPC .................................................... G06F 3/1454
  USPC ......................................................... 345/156
  See application file for complete search history.

(56) References Cited

U.S. PATENT DOCUMENTS

| 9,690,100 | B1 | 6/2017 | Eddings |
| 2009/0073330 | A1 | 3/2009 | Viala |
| 2014/0253589 | A1* | 9/2014 | Tout ................. G06K 19/06159 |
| | | | 345/633 |
| 2019/0235246 | A1* | 8/2019 | Hu .......................... G06F 3/011 |

FOREIGN PATENT DOCUMENTS

| CN | 103646587 A | 3/2014 |
| TW | 201633102 A | 9/2016 |
| TW | 202147074 A | 12/2021 |

\* cited by examiner

*Primary Examiner* — Long D Pham
(74) *Attorney, Agent, or Firm* — Winston Hsu

(57) ABSTRACT

A user interaction system includes a platform, comprising: a memory, for storing display contents; and a processor, for transmitting the display contents; and a plurality of see-through displays, coupled to the platform, wherein each see-through display of the plurality of see-through displays comprises: a frame; a controller, arranged on the frame, for receiving the display contents and transmitting a control signal according to the display contents; and a lens, arranged on the frame, for displaying the display contents according to the control signal, comprising: a front side, wherein the display contents is displayed on the front side, allowing passersby to see the display contents; and a back side, wherein ambient light transmits through the lens, allowing a user to see surroundings from the back side.

9 Claims, 16 Drawing Sheets

Front side

Back side

PLATFORM AND SEE-THROUGH DISPLAY HAVING LENS DISPLAYING CONTENT ON FRONT AND BACK SIDES

BACKGROUND OF THE INVENTION

1. Field of the Invention

The present invention relates to a user interaction system, platform and see-through display, and more particularly, to a user interaction system, platform and see-through display that can provide and display images at one side of the see-through display while the effecting to the user's vision from the other side is acceptable.

2. Description of the Prior Art

Nowadays, virtual platforms are well-developed and widely used for exchanging information. If a wearable device could bridge the gap between virtual and real-life interactions, it could enhance the wearer's connection when using the virtual platforms.

Glasses are a common accessory in daily life and are well-suited to serve as an interaction medium for wearable device. However, current methods for displaying images on glasses (such as using semi-transparent coating lenses or perforated opaque lenses) can only display static images and cannot dynamically change the images. Additionally, the displayed images may interfere with the wearer's vision. As such, one of the goals of the industry is to develop glasses that can display images without obstructing the wearer's vision.

SUMMARY OF THE INVENTION

The present invention is to provide a see-through display, an electrical controlling eyewear and a user interaction system to solve the above problems.

The present invention provides a user interaction system, comprising a platform, comprising: a memory, for storing display contents; and a processor, for transmitting the display contents; and a plurality of see-through displays, coupled to the platform, wherein each see-through display of the plurality of see-through displays comprises: a frame; a controller, arranged on the frame, for receiving the display contents and transmitting a control signal according to the display contents; and a lens, arranged on the frame, for displaying the display contents according to the control signal, comprising: a front side, wherein the display contents is displayed on the front side, allowing passersby to see the display contents; and a back side, wherein ambient light transmits through the lens, allowing a user to see surroundings from the back side.

The present invention provides a platform, for a plurality of see-through displays, comprising: a memory, for storing display contents; and a processor, for transmitting the display contents to a plurality of see-through displays; wherein each see-through display of the plurality of see-through displays comprises: a frame; a controller, arranged on the frame, for receiving the display contents and transmitting a control signal according to the display contents; and a lens, arranged on the frame, for displaying the display contents according to the control signal, comprising: a front side, wherein the display contents is displayed on the front side, allowing passersby to see the display contents; and a back side, wherein ambient light transmits through the lens, allowing a user to see their surroundings from the back side.

The present invention provides a see-through display, for displaying display contents received from a platform, comprising: a frame; a controller, arranged on the frame, for receiving the display contents and transmitting a control signal according to the display contents; and a lens, arranged on the frame, for displaying the display contents according to the control signal, comprising: a front side, wherein the display contents is displayed on the front side, allowing passersby to see the display contents; and a back side, wherein ambient light transmits through the lens, allowing a user to see their surroundings from the back side.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
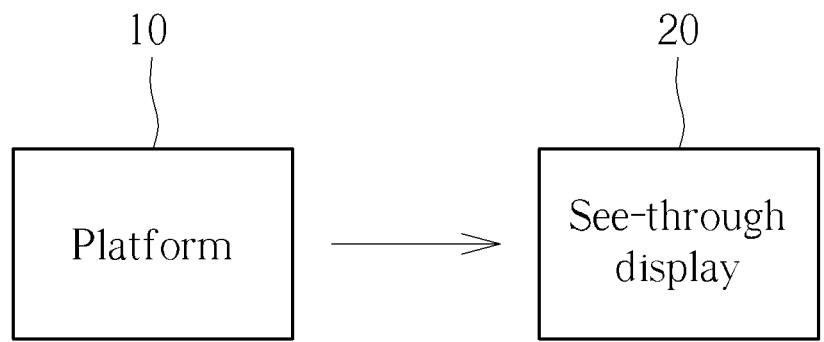
FIG. 1 is a schematic diagram of a user interaction system according to an embodiment of the present invention.

Please refer to FIG. 1. FIG. 1 is a schematic diagram of a user interaction system 1 according to an embodiment of the present invention. As shown in FIG. 1, the user interaction system 1 includes a platform 10 and a see-through display 20. The platform 10 is coupled to the see-through display 20, and may provide display content for the see-through display 20 to show. Specifically, the display content may be various images or videos that can be dynamically displayed by the see-through display 20. It should be noted that the see-through display 20 may be implemented in the form of a window, a door, a windshield, a show case, a partition, a wall, a mask, an eyewear, etc., but not limited thereto. For clarity, in the following embodiments, the see-through display is implemented as an electrical controlling eyewear 30 as an example.

Figure 2:
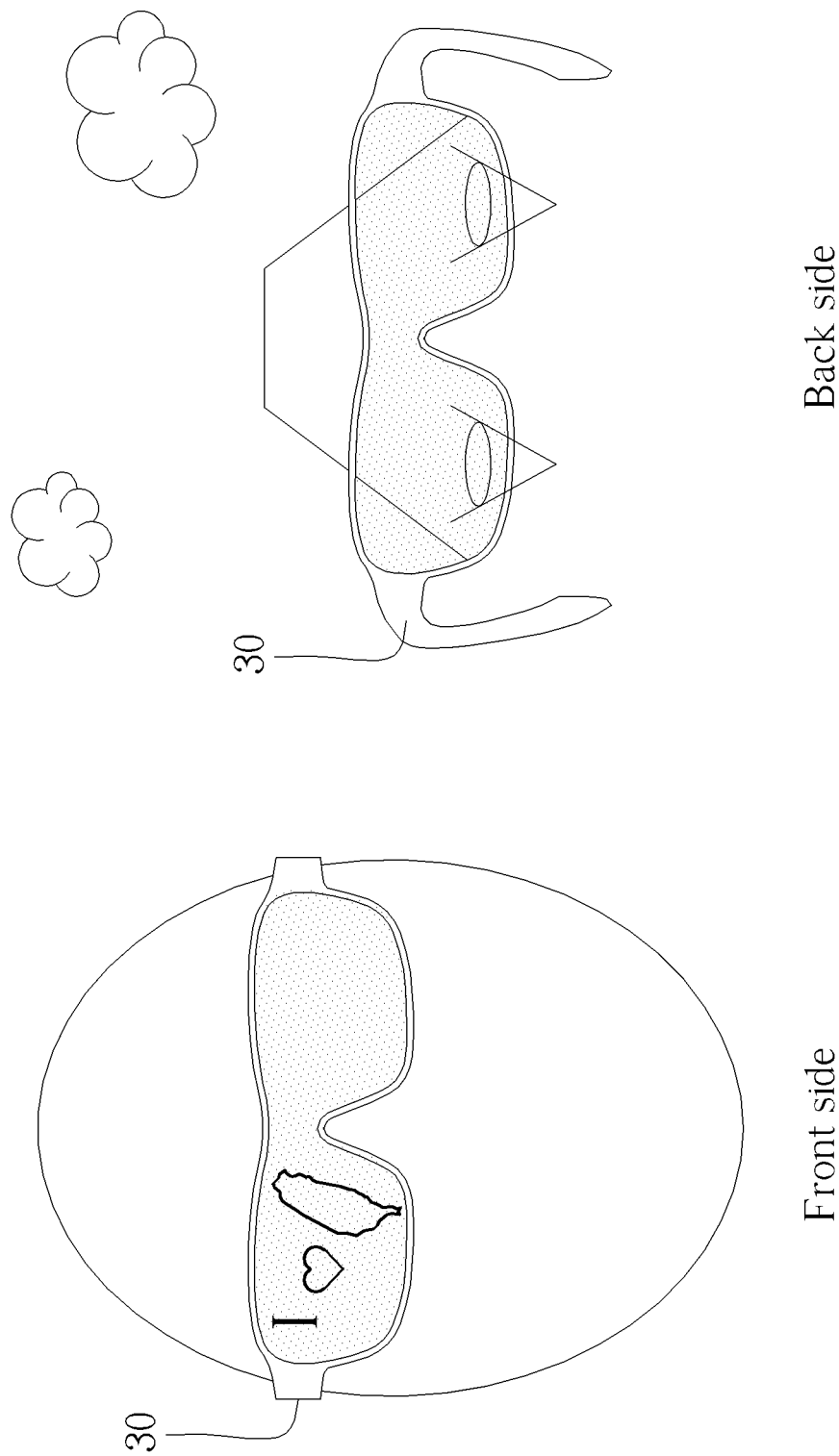
FIG. 2 shows schematic diagrams of visual states of a front side and a back side of an electrical controlling eyewear shown in FIG. 1 according to an embodiment of the present invention.

When the electrical controlling eyewear 30 displays the display content, a vision or a line of sight of a wearer (i.e. user of the electrical controlling eyewear 30) will not be affected. In other words, the display content will not interfere with the user's vision. It should be noted that, not affecting the sight of the wearer may also mean that the display content partially interferes with the sight of the wearer, but the wearer may still clearly see his/her surroundings. Please refer to FIG. 2, which shows a schematic diagram of visual states of a front side and a back side of the electrical controlling eyewear 30 according to an embodiment of the present invention. As shown in FIG. 2, an advertisement for a mobile phone is displayed on the front side of the electrical controlling eyewear 30, allowing passersby to see the advertisement. On the other hand, ambient light may transmit through the electrical controlling eyewear 30, allowing the wearer to clearly see his/her surroundings from the back side of the electrical controlling eyewear 30.

Figure 3:
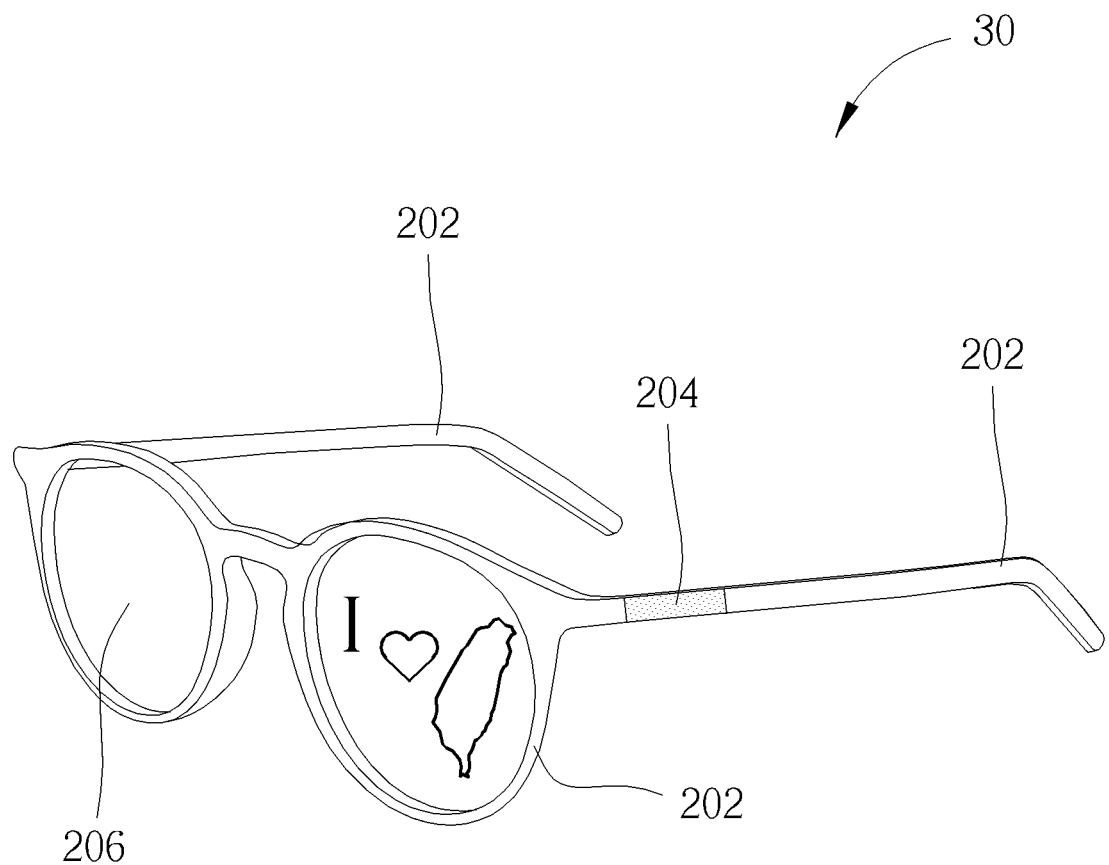
FIG. 3 is a schematic diagram of the electrical controlling eyewear shown in FIG. 1 according to the embodiment of the present invention.

Please refer to FIG. 3. FIG. 3 is a schematic diagram of the electrical controlling eyewear 30 according to an embodiment of the present invention. As shown in FIG. 3, the electrical controlling eyewear 30 includes a frame 202, a controller 204 and a lens 206. The controller 204, arranged on the frame 202, receives the display content from the platform 10 and transmits a control signal according to the display content. The lens 206, arranged on the frame 202 and coupled to the controller 204, receives the control signal and displays the display content accordingly. It should be noted that the electrical controlling eyewear 30 of the present invention may not include the frame 202, that is, the controller 204 and the lens 206 may be configured or coupled in other forms. For example, the controller 204 is a plug-in or magnetic glasses accessory. In addition, the lens 206 may also be combined with other wearable devices, such as virtual reality devices, augmented devices, sunglasses, vision correction glasses, snow goggles, helmets or masks, but not limited thereto.

Figure 4:
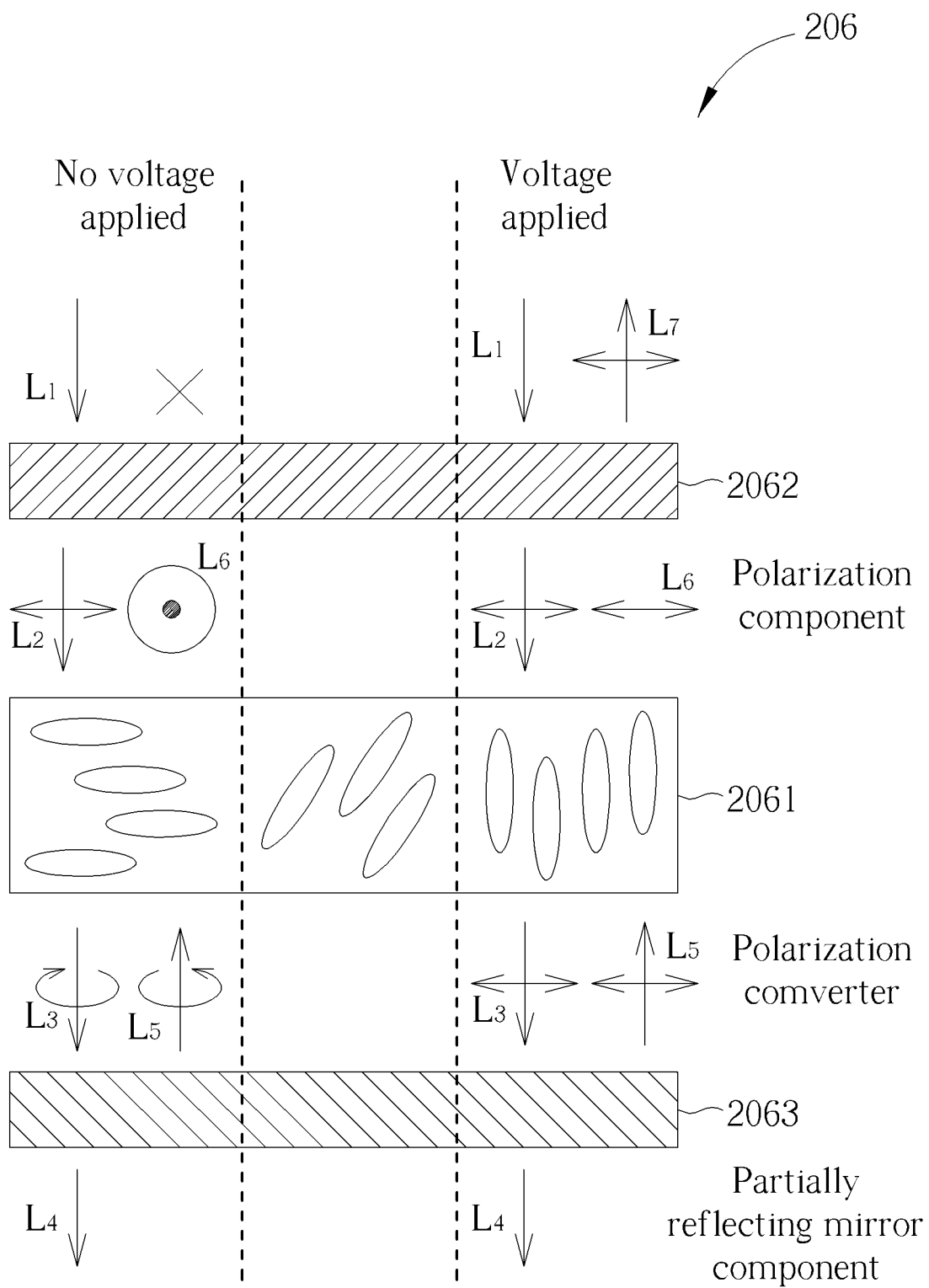
FIG. 4 is a schematic diagram of a lens of a see-through display according to an embodiment of the present invention.

To prevent the display content displayed on the lens 206 from interfering with the ambient light passing through the lens 206, the present invention utilizes various components to control a polarization state of light. Please refer to FIG. 4. FIG. 4 is a schematic diagram of a see-through display of the lens 206 according to an embodiment of the present invention. The lens 206 includes a polarization converter 2061 disposed between a polarization component 2062 and a partially reflecting mirror component 2063. The polarization component 2062 confines the polarization state of the ambient light, the partially reflecting mirror component 2063 reflects and transmits the ambient light, and the polarization converter 2061 converts the polarization state of the ambient light passed through the polarization component 2062. It should be noted that at least one of the polarization component 2062, the partially reflecting mirror component 2063 and the polarization converter 2061 is a liquid crystal panel with active matrix connected to the controller 204 for displaying the display content according to the control signal. In an embodiment, as shown in FIG. 4, when the polarization converter 2061 displays the display content according to the control signal and ambient light L1 hits the polarization component 2062 of the lens 206, the ambient light L1 passes through three components to become transmitted lights L2, L3 and L4 respectively. In addition, part of the transmitted light L3 is reflected by the partially reflecting mirror component 2063 and passes through the polarization converter 2061 and the polarization component 2062, as shown by a reflected light L5 and transmitted lights L6 and L7 in FIG. 4. In this way, the wearer may see the transmitted light L4—that is, the wearer may see his/her surroundings (e.g. roads and scenery) from the back side of the electrical controlling eyewear 30, as shown in FIG. 2.

Furthermore, the controller 204 may use the control signal to apply a voltage to the polarization converter 2061, causing the liquid crystals in the polarization converter 2061 to change to a first arrangement. In detail, the ambient light L1 is polarized into the transmitted light L2 with a linear polarization state (as indicated by double arrow on the transmitted light L2 in FIG. 4). When the voltage is applied to the polarization converter 2061, as shown on the right part of FIG. 4, the first arrangement of the liquid crystals does not change the polarization state of the transmitted light L2. Specifically, the transmitted light L3 has the linear polarization state, and the reflected light L5 and the transmitted lights L6 and L7 also have the linear polarization state. In this way, the passersby may see the transmitted light L7 with the linear state—that is, the display area of the polarization converter 2061 has high reflectance to the front side. It should be noted that the reflectivity on the front side changes with the localized optical modulation of the liquid crystal in the polarization converter 2061, thereby displaying the display content. While displaying the display content, the transmittance of the lens changes very little.

On the contrary, the controller 204 may instruct that no voltage be applied to the polarization converter 2061 through the control signal (as shown on the left part of FIG. 4), causing the liquid crystals in the polarization converter 2061 to change to a second arrangement. In detail, the ambient light L1 is polarized into the transmitted light L2 with the linear state. When no voltage is applied to the polarization converter 2061, as shown on the left part of FIG. 4, the second arrangement of the liquid crystals may change the polarization state of the transmitted light L2. Specifically, the transmitted light L3 has either a levorotatory polarization state or a dextrorotatory polarization state, and the reflected light L5 has either the dextrorotatory polarization state or the levorotatory polarization state accordingly. When the reflected light L5 with either the dextrorotatory polarization state or the levorotatory polarization state passes through the polarization converter 2061 with no voltage applied, the transmitted light L6 has a linear polarization state orthogonal to the transmitted light L2. When the transmitted light L6 with the linear polarization state hits the polarization component 2062, the transmitted light L6 with the linear polarization state cannot pass through the polarization component 2062—meaning the display area of the polarization converter 2061 has low reflectance to the front side. It should be noted that changes in the polarization state caused by variously polarized lights hitting different components are well known in the art and will not be repeated here. In addition, the above-mentioned polarization state control method is only one embodiment, and other embodiments of the present invention may utilize other polarization state modulation methods, and those skilled in the art may make appropriate adjustments according to the system requirements. For example, the polarization component 2062 may generate left-handed or right-handed polarized light, so that the transmitted light L6 is dark when the liquid crystal of the polarization converter 2061 is vertical, and the transmitted light L6 is bright when the liquid crystal of the polarization converter 2061 is horizontal.

It should be noted that FIG. 4 only shows one embodiment of the present invention, and those skilled in the art may make appropriate adjustments according to the system requirements. For example, the see-through display may further include a tinting component adjacent to or integrated with the partially reflecting mirror component 2063. The tinting component may regulate a transmittance and a reflectance of the lens 206, allowing the electrical controlling eyewear 30 to function as sunglasses for the wearer. For example, the see-through display may further include a diffusor to increase the viewing angle of the display content displayed on the electrical controlling eyewear 30. The diffusor can be a surface with micro structure such as bumps, slants, squares. The surface can be integrated with the partially reflecting mirror. The diffusor can also be a film with micro patterned refractive index distribution.

Figure 5A:
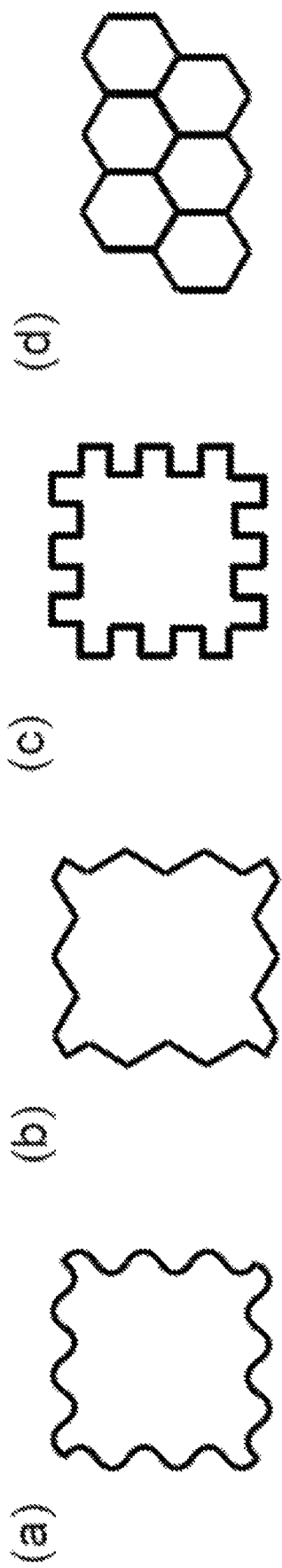
FIG. 5A shows schematic diagrams of various shapes of each pixel of the polarization converter according to an embodiment of the present invention.

On the other hand, the polarization converter 2061, the polarization component 2062 and the partially reflecting mirror component 2063 may have various implementations, as long as the basic functions of each component may be realized, which is within the scope of the present invention. For example, the polarization component 2062 may be a polarizer, a color filter, a wave-plate, an anti-reflection film, an anti-smudge film, an angular attenuation filter or a combination of the above components. It should be noted that the above components are not limited to the polarization component 2062 and may be added at any position in the lens, and the characteristics of the above components may be configured graphically or electronically controlled according to the pixel shape and position. A material of the polarization component 2062 includes iodine or dye-based substance. The polarization converter 2061 may be an active matrix liquid crystal panel or a passive matrix liquid crystal panel, an aperture ratio of the polarization converter 2061 is higher than 50%, and the liquid crystal panel may integrated with touch sensors. In addition, the polarization converter 2061 may be realized by a zenithal bistable alignment or cholesteric liquid crystals to operate in a bistable state for power saving. It should be note that each pixel of the polarization converter 2061 may have a curved, sawtooth, or polygon shape, and an opaque line of the polarization converter 2061 may be thinner than 15 microns, and a size of each pixel of the polarization converter 2061 may be larger than 100 microns*100 microns. For example, FIG. 5A shows schematic diagrams of various shapes of each pixel of the polarization converter 2061. In this way, a diffraction or a screen door effect of the polarization converter 2061 may be reduced. Also, the liquid crystal panel may be configured to operate in twist nematic, electrically controlled birefringence, optically compensated bend, in-plane switching, fringe field switching, ferroelectric liquid crystal, cholesteric liquid crystal, dye-doped liquid crystal or polymer dispersed liquid crystal mode. Furthermore, the partially reflecting mirror component 2063 may be metal-coated or dielectric-coated. It should also be noted that principles behind the polarization converter 2061, the polarization component 2062 and the partially reflecting mirror component 2063 should be well known in the art, and will not be repeated here.

Figure 5B:
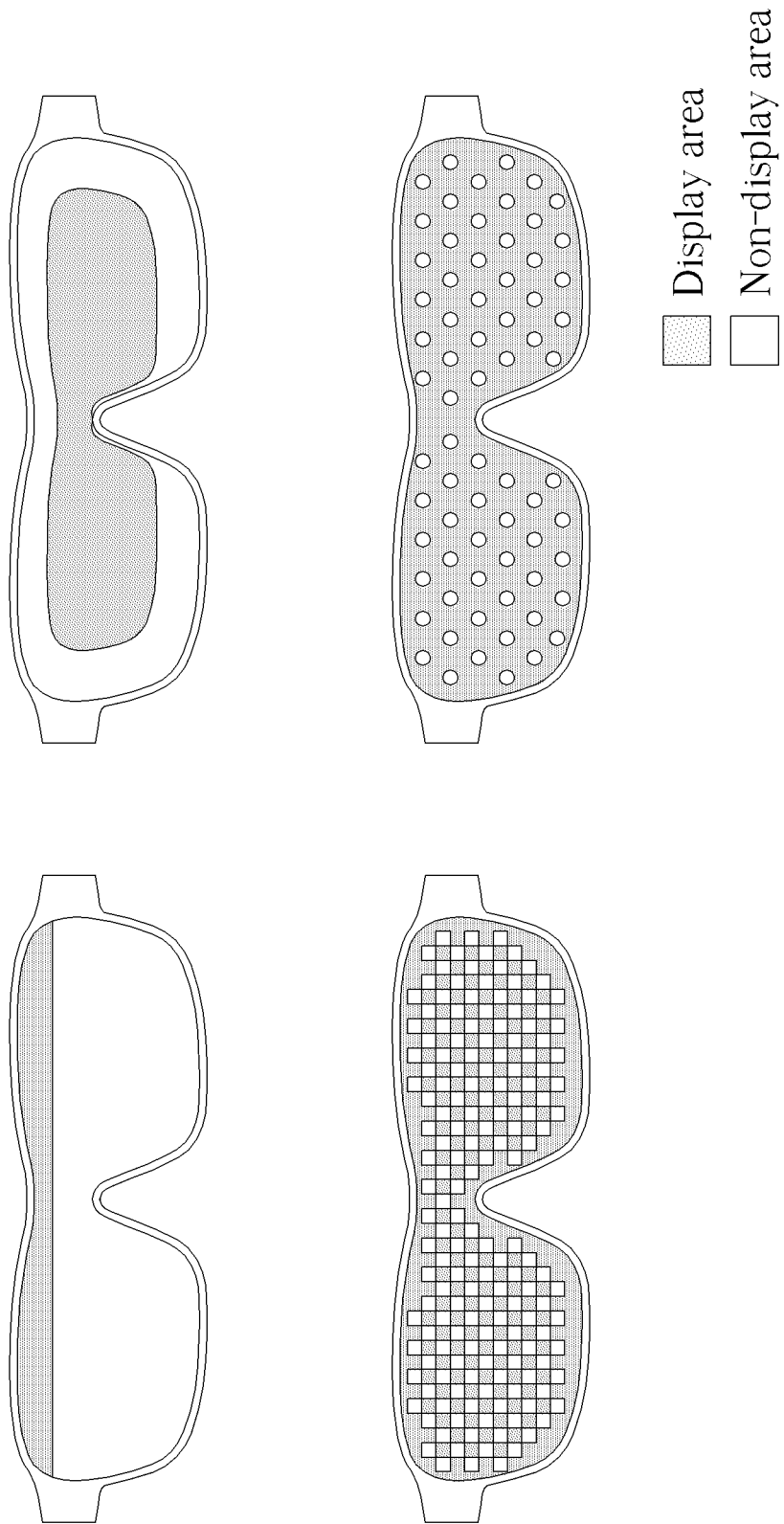
FIG. 5B shows schematic diagrams of various patterns of a display area and a non-display area according to an embodiment of the present invention.

Furthermore, the polarization component 2062 and the partially reflecting mirror component 2063 may also be realized using various types of liquid crystals. In an embodiment, the partially reflecting mirror component 2063 may comprises micro structures or micro refractive index distribution that diffuses the ambient light. In another embodiment, the diffuser is directed attached to the partially reflecting mirror component. In an embodiment, the polarization component 2062 is a first liquid crystal panel with a dichroic dye, while in the lens 40, the partially reflecting mirror component 2063 is a second liquid crystal panel filled with cholesteric liquid crystal layer. In detail, an extinction ratio of the first liquid crystal layer with a dichroic dye can be electrically tunable to control a visibility of the display content and a visual brightness. By locally control the extinction ratio, the polarization component 2062 may also provide display functions. In another embodiment, the partially reflecting mirror component 2063 is a first liquid crystal panel with cholesteric liquid crystal. The reflectance of cholesteric liquid crystal may be electrically tunable to control a visibility of the display content and a visual brightness. By locally control the reflectance, the partially reflecting mirror component 2063 may also provide display functions. On the other hand, the liquid crystals in the cholesteric liquid crystal layer may be aligned with geometric distribution to provide additional phase modulation for the wearer's vision. In an embodiment, when the polarization converter 2061, the polarization component 2062 and the partially reflecting mirror component 2063 are realized in various types of liquid crystals, any of the polarization converter 2061, the polarization component 2062 and the partially reflecting mirror component 2063 may segment the lens 20 into a display area and a non-display area for the display content. For example, FIG. 5B shows schematic diagrams of various patterns of the display area and the non-display area according to the embodiment of the present invention.

Figure 6A:
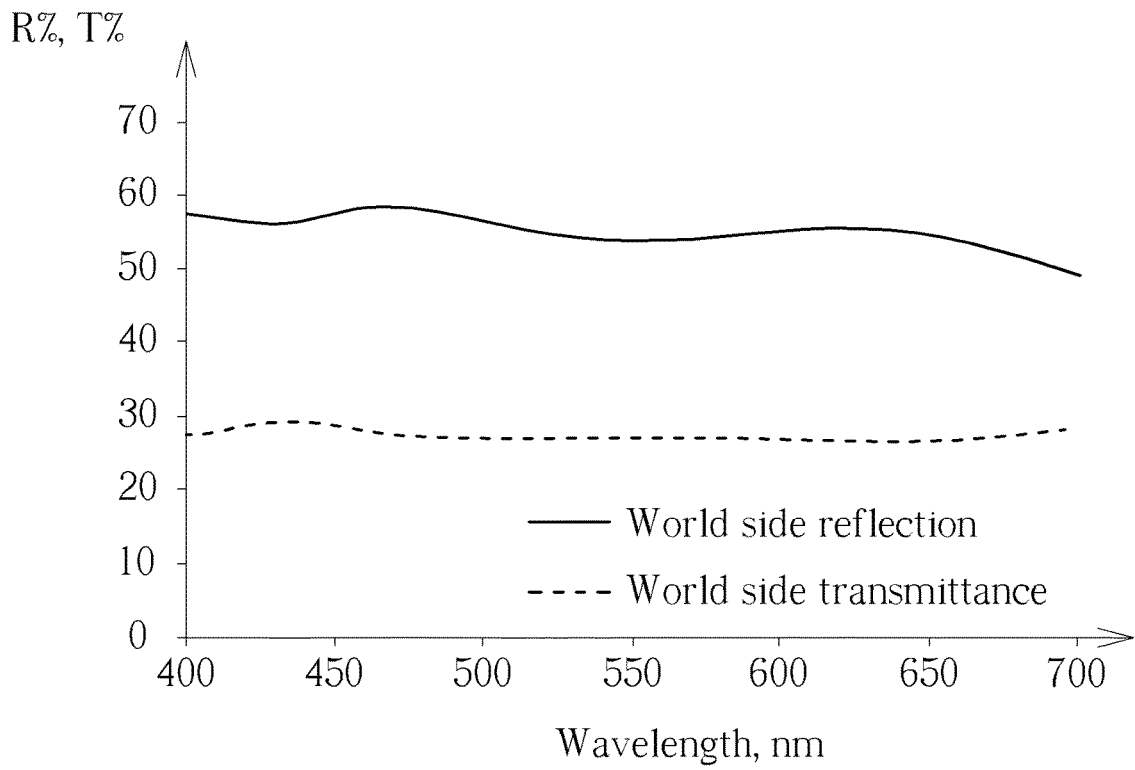
FIGS. 6A-6D diagrams of dispersion are schematic characteristics of the three components of the see-through display according to the embodiments of the present invention.
Figure 6B:
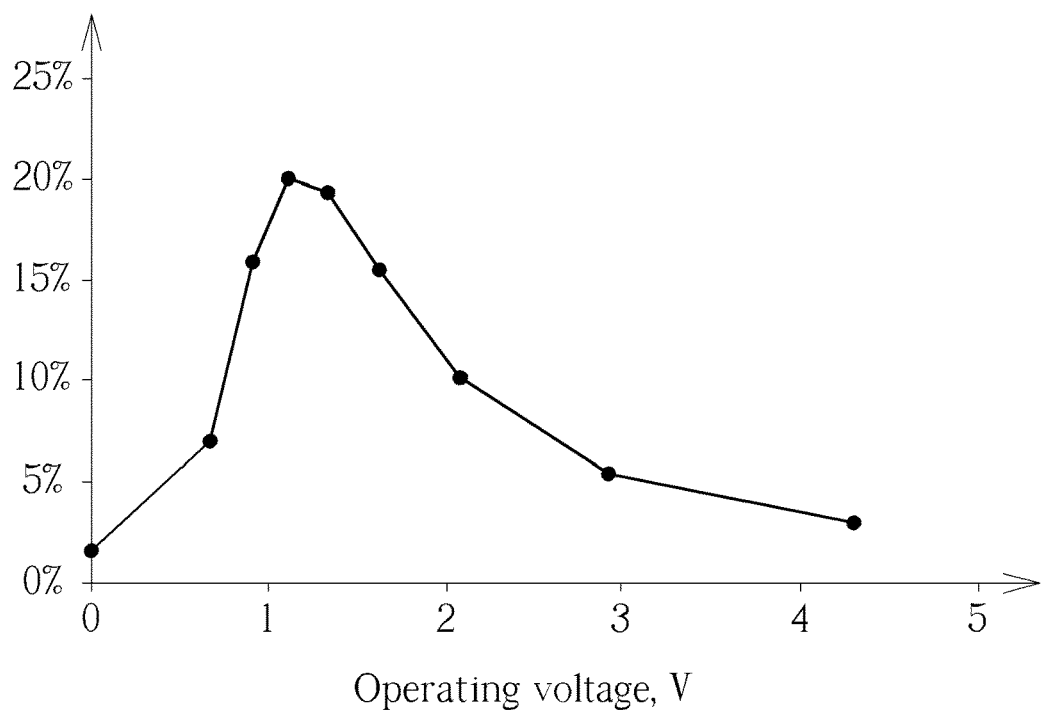
Figure 6C:
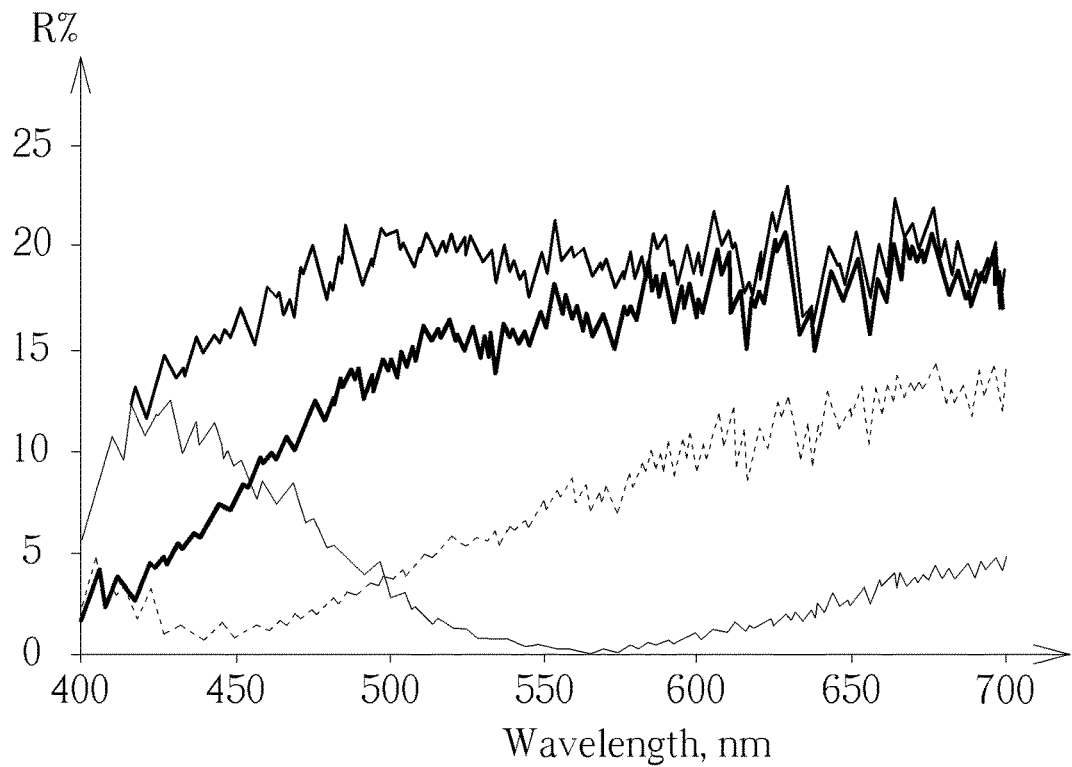
Figure 6D:
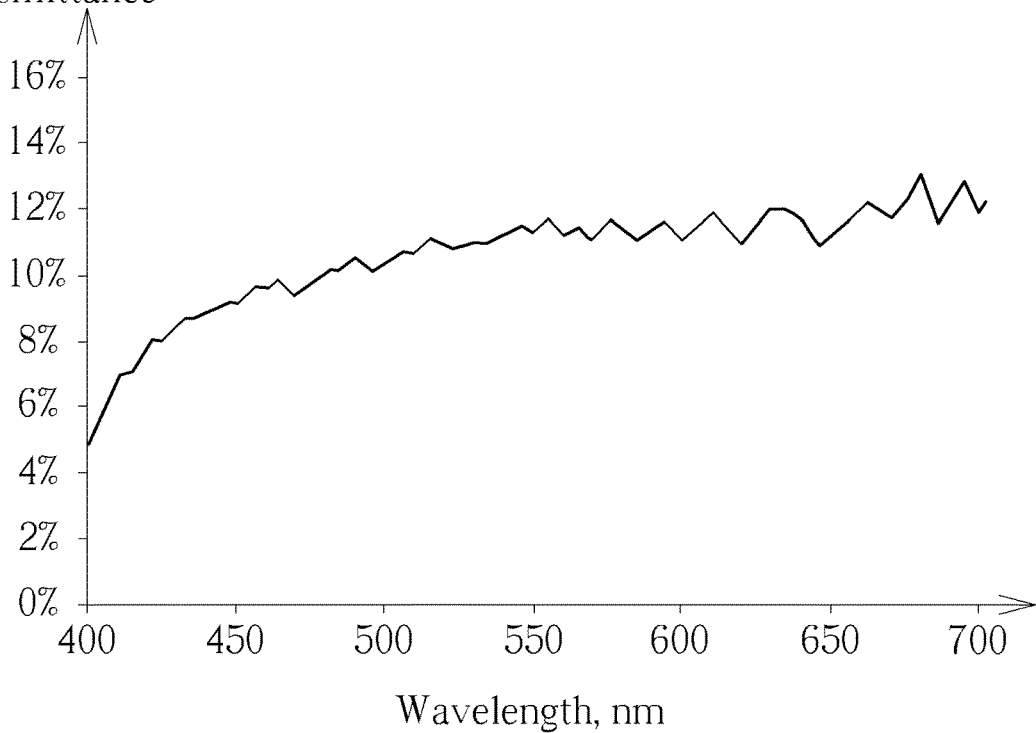

Furthermore, as shown in FIGS. 6A-6D, FIGS. 6A-6D are schematic diagrams of dispersion characteristics of the three components of the see-through display 20 according to the embodiments of the present invention. As shown in FIGS. 6A-6D, by separately adjusting the dispersion characteristics of the three components of the see-through display 20 to the wavelength, the present invention may realize the see-through display that can display colors. Specifically, FIG. 6A illustrates a reflectivity and a transmittance to wavelength spectrum of the partially reflecting mirror component 2063; FIG. 6B illustrates various reflectivity of the lens 206 under different operating voltages; FIG. 6C illustrates the reflectivity to the wavelength spectrum of the lens 206 under different operating voltages; FIG. 6D illustrates a penetration spectrum of the lens 206 under different operating voltages. It should be noted that, adjusting the dispersion characteristics to the wavelength are well known in the art and will not be repeated here.

In another embodiment, each display gray level of the see-through display 20 corresponds to a specific color (as shown in FIG. 6C). When the see-through display 20 compiles and displays display gray levels, color digital display content (RGB) to be displayed needs to be converted into a digital driving signal that is compatible with the see-through display 20. The conversion requires a gamma table that describes the light intensity and color corresponding to each display gray level. It should be noted that the conversion of the driving digital signal may be performed by system firmware, system software, driving hardware, or combination of the above.

Figure 7:
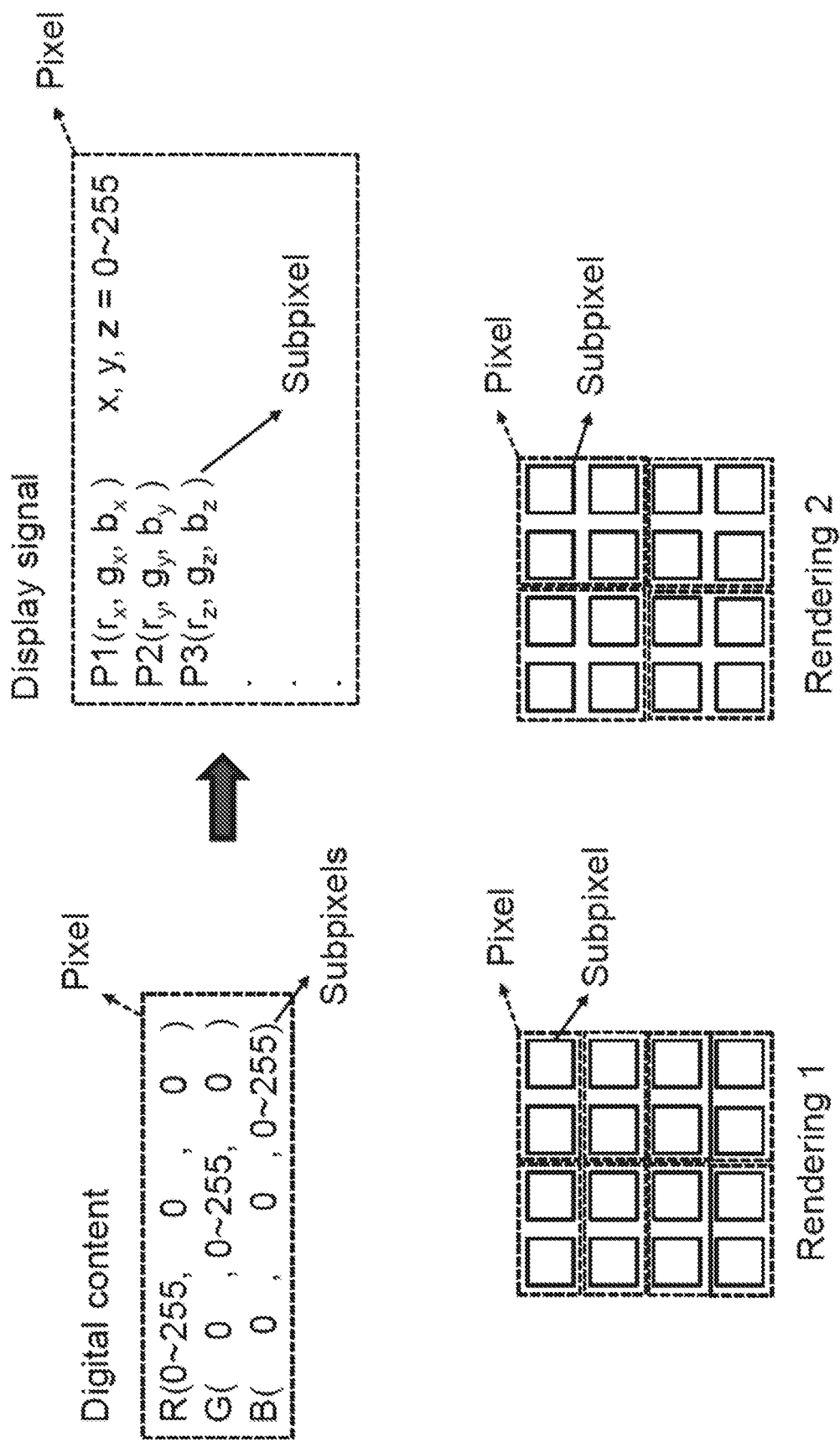
FIG. 7 shows a schematic diagram of the original color to be displayed mixed of RGB operating at various display gray levels according to the embodiments of the present invention.

In another embodiment, the liquid crystal panel may include a plurality of pixels. Each pixel of the plurality of pixels includes multiple subpixels, and a displaying color of each pixel is mixed by colors of the subpixels operating at various display gray levels. In the general RGB color mode, each subpixels controls the gray level of either red, green, or blue. The driving signal of RGB subpixels directly corresponds to the general RGB data format. On the other hand, in the see-through display 20, a specific RGB color to be displayed is mixed with multiple subpixels operating at different display gray levels. All the subpixels share the same gamma table, in which each gray level corresponds to a set of light intensity and RGB color. As shown in FIG. 7, the original color to be displayed is mixed of RGB operating at various display gray levels with corresponding RGB color. In other words, the original color needs to be converted into three or more identical pixels operated by mixing multiple different RGB combinations. Under such characteristics, the formation of the subpixels of the see-through display 20 may be distributed in space or time. The number and configuration of subpixels that mix up a pixel may be adjusted through the signal from the controller 204. In addition, the resolution may also be increased through oblation techniques.

In another embodiment, as shown in FIG. 6D, when the see-through display 20 operates at various display gray levels, its transmittance and spectrum remain unchanged. However, the transmittance and reflectivity of obliquely incident light on different interfaces will vary depending on the polarization state of the incident light. Therefore, the content displayed on the front reflective surface will be visible with a large viewing angle in terms of transmittance. To reduce the degree of leakage of display content at large angles, compensation components may be added to the see-through display 20, such as adding retardation film or coating to reduce the Fresnel reflection polarization difference of the interface; or using segmented retardation film with locally aligned LC, but not limited thereto. In this way, the light in the viewing angle direction is maintained in the same polarization state.

In another embodiment, the lens may further include an optical compensation component. The optical compensation component reduces the difference in transmittance of light passing through the lens diagonally when switching between different display gray levels. The optical compensation component may be film, coating or liquid crystal panel.

Figure 8A:
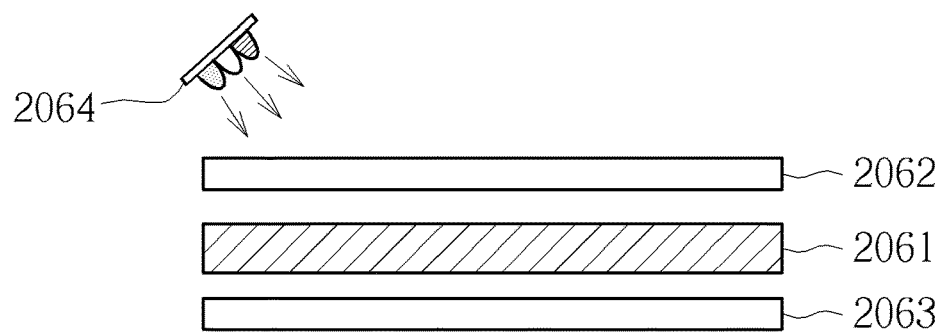
FIGS. 8A-8E are schematic diagrams of the electrical controlling eyewear according to embodiments of the present invention.
Figure 8B:
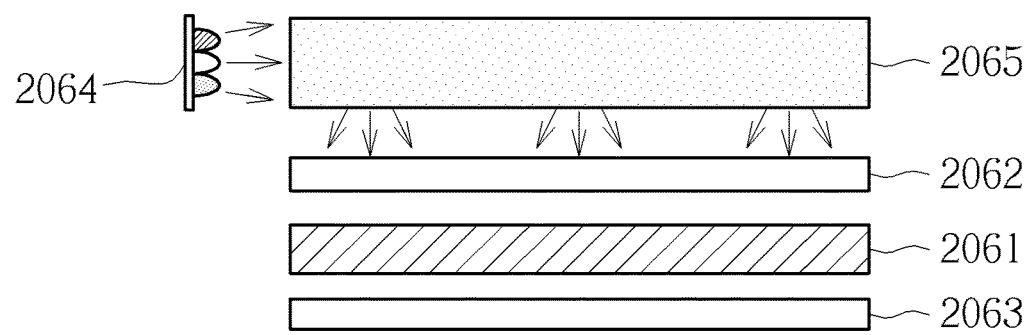
Figure 8C:
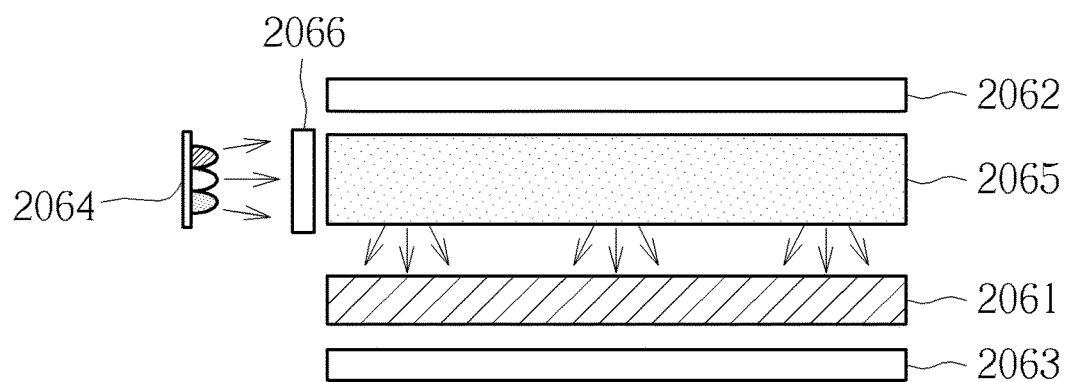
Figure 8D:
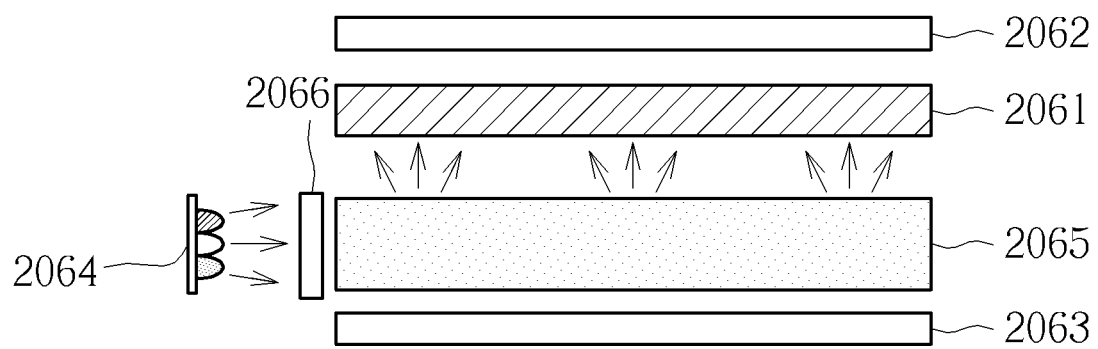
Figure 8E:
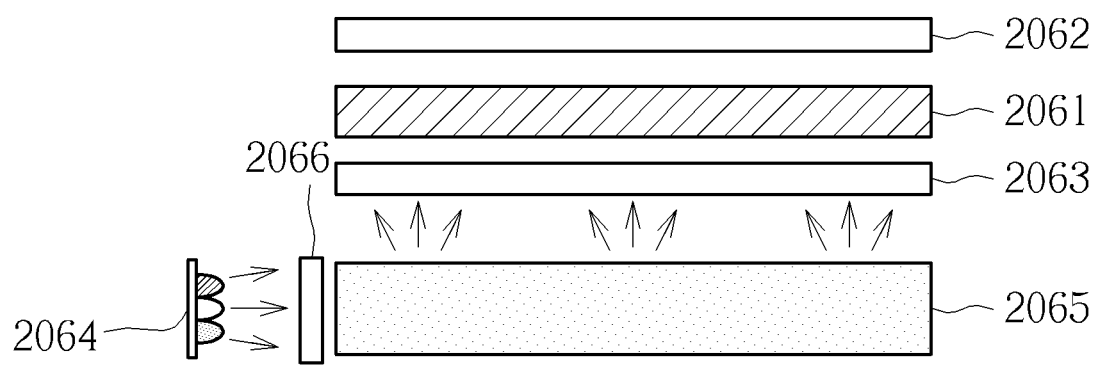

In another embodiment, the see-through display 20 or the electrical controlling eyewear 30 may further includes a light source 2064, for providing sufficient light. Please refer to FIGS. 8A-8E, FIGS. 8A-8E are schematic diagrams of the electrical controlling eyewear 30 according to embodiments of the present invention. Specifically, for various positions of the light source 2064, the lens of the present invention is further configured with an additional polarization component or a waveguide. For example, as shown in FIGS. 8A-8B, the light source 2064 is arranged above the polarization component 2062 to provide sufficient light to the electrical controlling eyewear 30. It should be noted that, the lens 206 in FIG. 8B further includes a waveguide 2065 to guide light into the polarization component 2062. As shown in FIGS. 8C-8E, the light source 2064 is arranged on the side of the lens 206 to provide sufficient light to the electrical controlling eyewear 30. It should be noted that, the lens 206 in FIGS. 8C-8E further includes the waveguide 2065 and an additional polarization component 2066 to guide light into various positions of the lens. In addition, FIGS. 8A-8E only shows embodiments of the present invention, and those skilled in the art may make appropriate adjustments according to the system requirements.

Figure 9A:
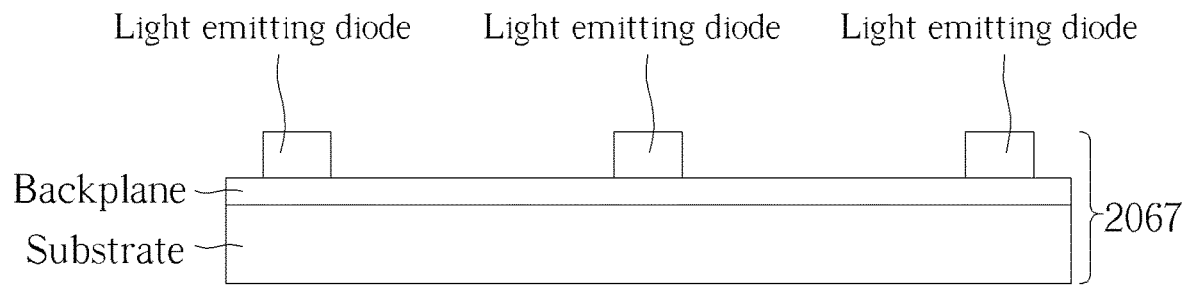
FIGS. 9A-9C are schematic diagrams of the active light source component according to embodiments of the present invention.
Figure 9B:
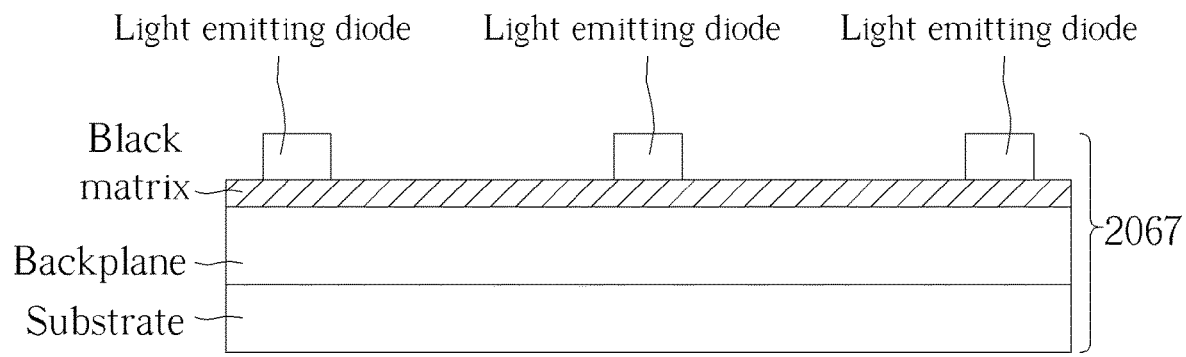
Figure 9C:
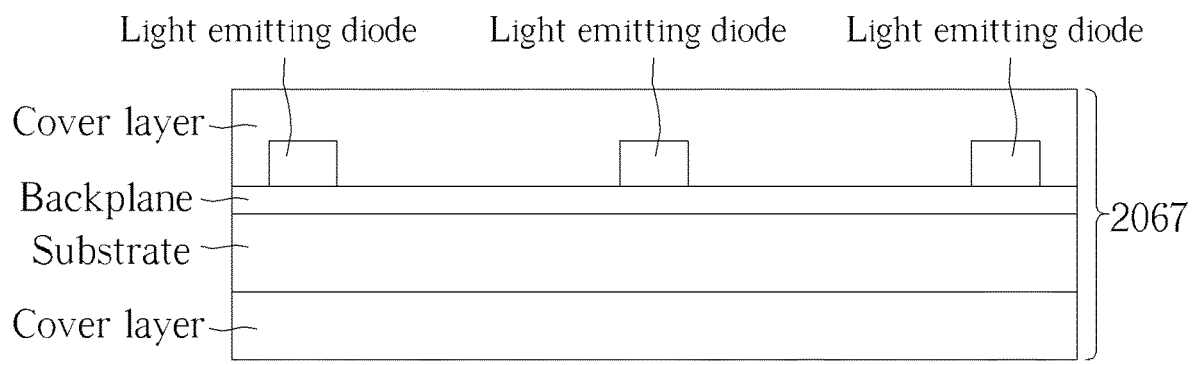
Figure 10A:
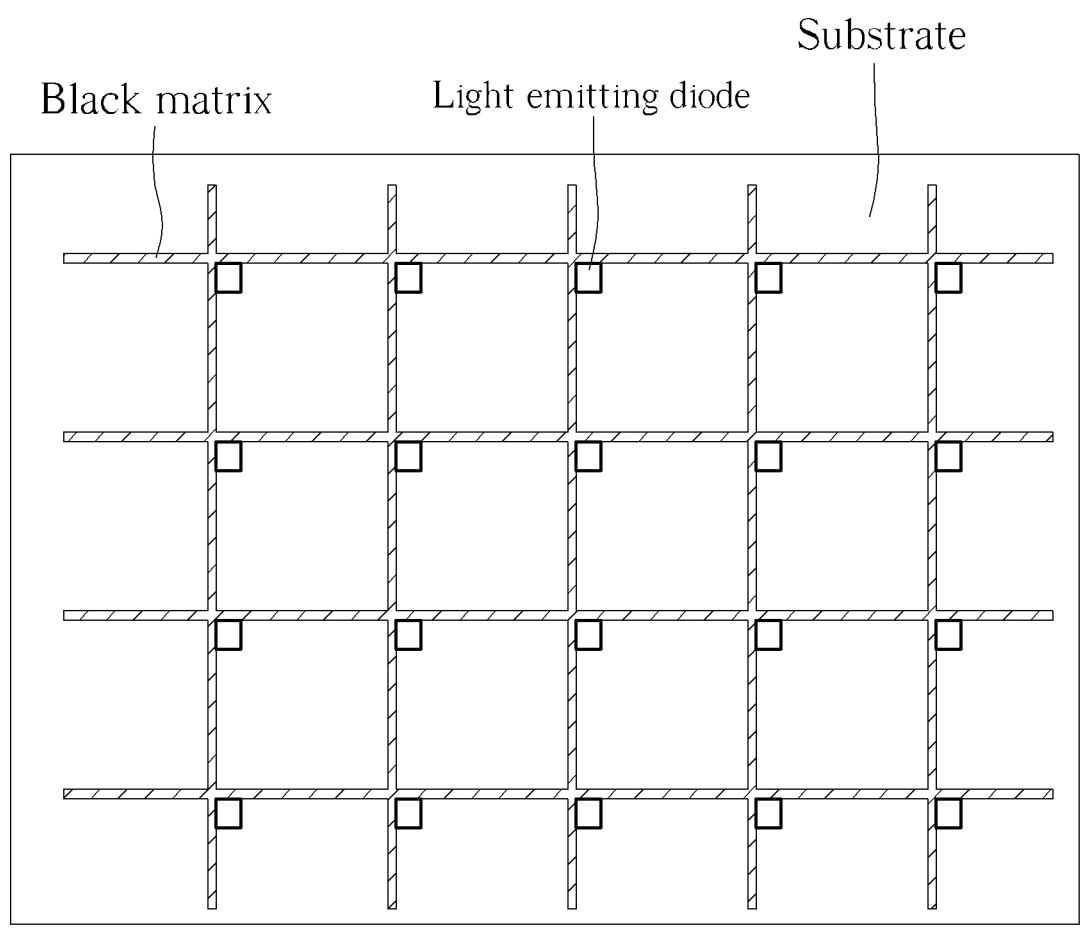
FIGS. 10A-10D are schematic diagrams of the black matrix according to embodiments of the present invention.
Figures 10B, 10C, 10D:
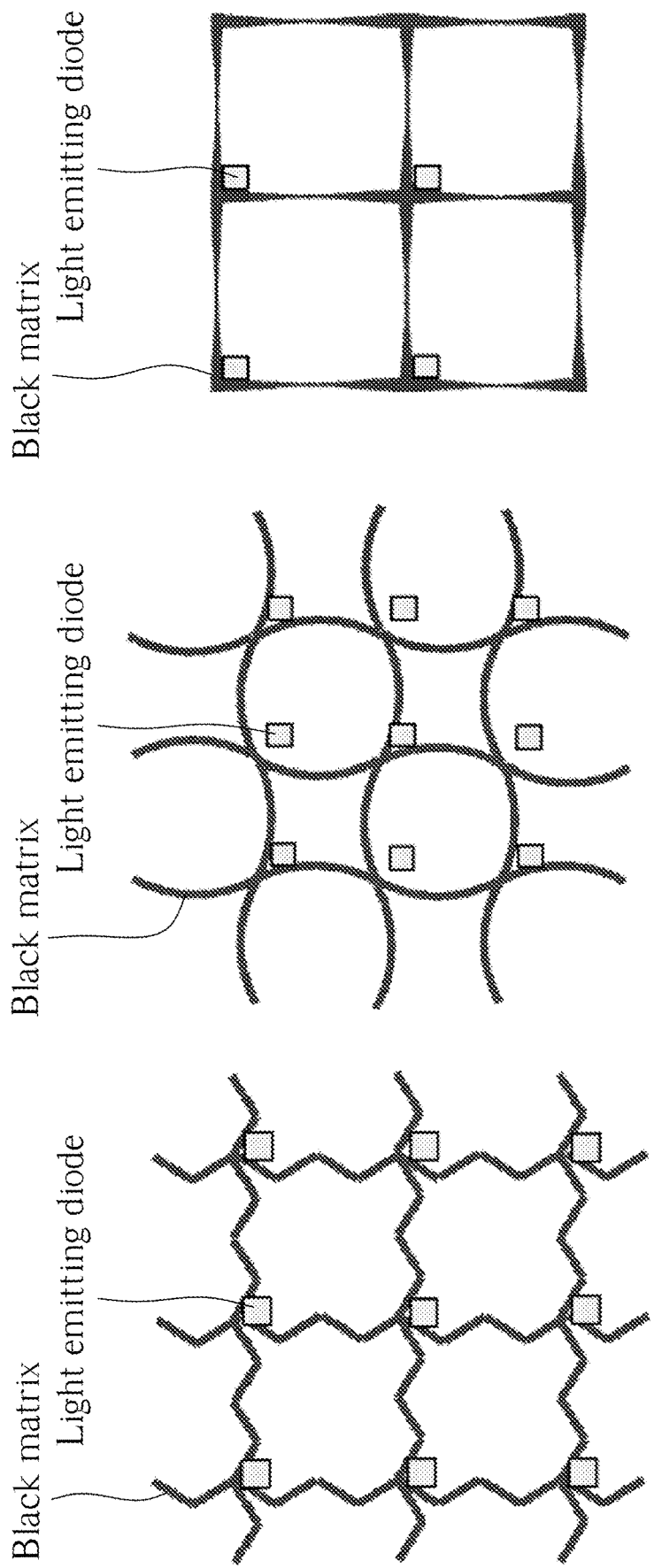

In another embodiment, the see-through display 20 or the electrical controlling eyewear 30 may further include another transparent display having an active light source component 2067 arranged between two of the polarization converter 2061, the polarization component 2062 and the partially reflecting mirror component 2063. Please refer to FIGS. 9A-9C, which are schematic diagrams of the active light source component 2067 according to embodiments of the present invention. The active light source component 2067 shown in FIG. 9A includes a plurality of light emitting diodes (LEDs) distributed in an array on a backplane and a substrate. In order to not affect the function of the see-through display 20 or the electrical controlling eyewear 30, the substrate and the backplane may be made of transparent materials. In additional, the active light source component 2067 shown in FIG. 9B further includes a black matrix distributed on the backplane and the substrate. The black matrix may be made of materials with high reflectivity or high absorption properties to absorb or reflect the light of specific wavelengths. In this way, the black matrix may block the emitting light from the LEDs and the reflecting light from the backplane or the substrate toward the wearer's eyes. Furthermore, the active light source component 2067 shown in FIG. 9C further includes cover layers put on the backplane and under the substrate. The cover layers are configured to control the emitting angle, color and polarization state of light to improve an energy efficiency and a display quality. The materials of the cover layer may be plastic, glass, lenses, color filter, polarizers, wave plates and other optical components. It should be noted that, as shown in FIGS. 10A-10D, the black matrix may be distributed as straight lines, curves or lines with varying thicknesses, allowing light to be diffracted in more directions.

Figure 11:
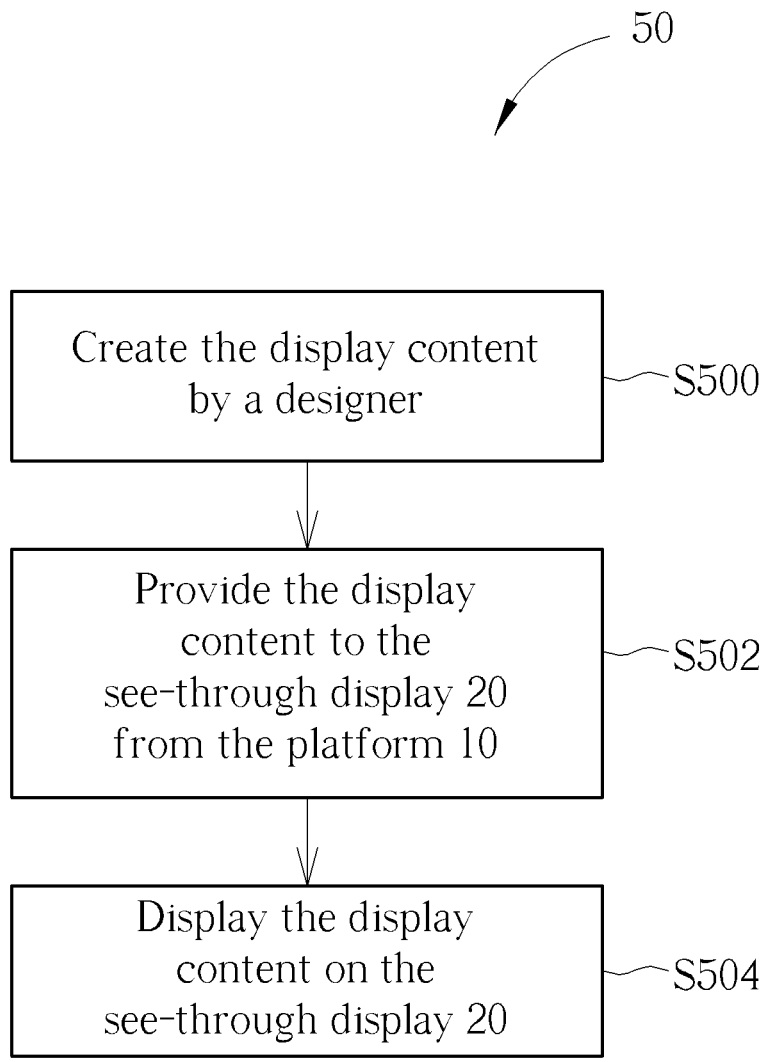
FIG. 11 is a flowchart of displaying display contents on the see-through display shown in FIG. 1 according to an embodiment of the present invention.

Finally, displaying the display content on the see-through display 20 or the electrical controlling eyewear 30 may be summarized as a flow 50, as shown in FIG. 11. The flow 50 includes the following steps:

Step S500: Create the display content by a designer.

Step S502: Provide the display content to the see-through display 20 or the electrical controlling eyewear 30 from the platform 10.

Step S504: Display the display content on the see-through display 20 or the electrical controlling eyewear 30.

In step S500, the designer such as a company, a store, or individual creates the display content to provide to the platform 10. The display content is in the forms of including image, graph or video. The display content may be an advertisement for a product, an emoticon, a digital artistic production such as NFT, or a gaming merchandise.

In step S502, the platform 10 provides the display content to an end user's electrical controlling eyewear 30. The platform 10 may include a hardware executing a software to provide the display content to the electrical controlling eyewear 30. For example, the hardware may be a mobile phone, a computer, a system on chip, an in-vehicle system or a broadcast system. The software may be a social media, an application program or a gaming program.

In step S504, the controller 204 receives the display content and controls the lens 206 to display the display content. In this way, the passersby may see the display content displayed on the front side of the electrical controlling eyewear 30.

In short, the electrical controlling eyewear of the present invention may utilize the lens including the liquid crystal panel disposed between the polarization component and the partially reflecting mirror component, and further control the transmitted light and the reflected light after the ambient light hits the lens. In this way, the passersby may see the display content displayed on the front side of the electrical controlling eyewear without affecting the user's vision.

Figure 12:
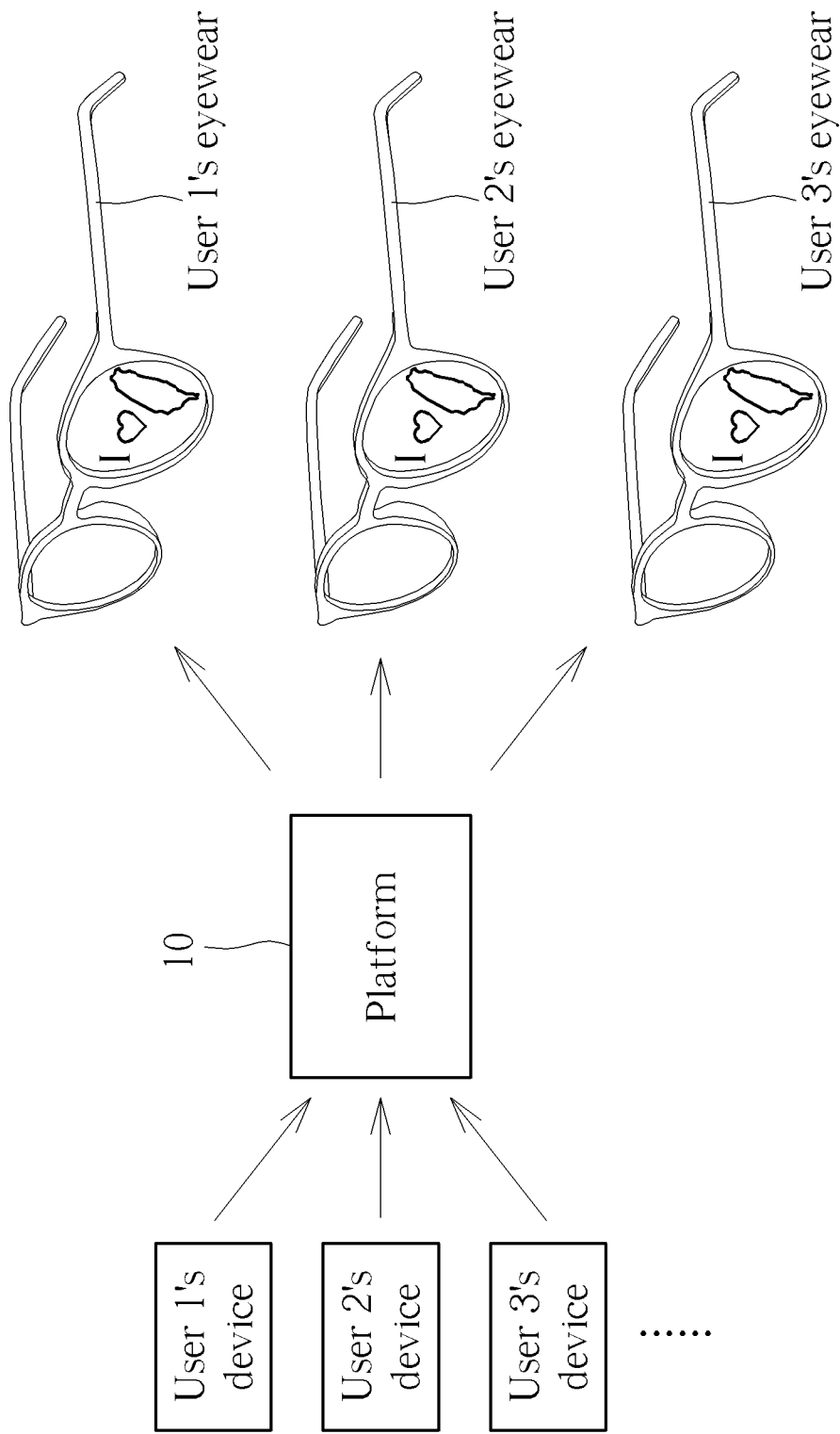
FIG. 12 is a schematic diagram of a user interaction system according to an embodiment of the present invention.

Furthermore, please refer to FIG. 12. FIG. 12 is a schematic diagram of a user interaction system 12 according to an embodiment of the present invention. As shown in FIG. 12, the user interaction system 12 may serve as an interactive platform for multiple users and electrical controlled eyewear worn by multiple users. It should be noted that, the detail description and derivative changes of the lens of the electrical controlled eyewear are described as above, and will not be repeated here. Specifically, the platform 10 includes a transceiver for receiving/transmitting signals/commands/data, a memory for storing the display contents and a processor for processing signals into the display contents according to the commands.

In an embodiment, the platform 10 may be a broadcast system that transmits the display contents and controls the multiple electrical controlled eyewear to display the display contents. It should be noted that, displaying the display contents on the electrical controlled eyewear may require consent from the user. In other words, the controller of the electrical controlled eyewear or the user's device wirelessly connected to the electrical controlled eyewear transmits a request to the platform. The platform transmits the display contents to the according device and drives the electrical controlled eyewear to display the display contents.

In another embodiment, the platform 10 includes a user interface for receiving the first request signal input by the users. The processor determines whether to transmit the display contents to the multiple electrical controlled eyewear in response to whether the first request signal is approved. In detail, the display contents may be images, animations, videos, trademarks, emoticons, texts, barcodes or Non-Fungible Token (NFT), etc., and the display contents may be copyrighted and tradable. Therefore, the first request signal may be a paid message. On the other hand, the first request signal having been approved may mean that the payment has been confirmed.

In another embodiment, users may interact with each other through the platform 10 regarding the display contents. Users may utilize the user interface to upload their creative display contents. The platform 10 may broadcast the display contents to other users, or verify other users' request signals.

In summary, the user interaction system of the present invention may provide a platform for users to interact, including creating, trading, transmitting, and receiving the display contents to be displayed on the front side of the electrical controlling eyewear without affecting the user's vision.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A user interaction system, comprising:
   a platform, comprising:
      a transceiver, for transmitting and receiving commands, information and digital contents;
      a processor, for generating and processing the display contents according to the commands, the information and the digital contents; and
      a memory, for storing the display contents; and
   a plurality of see-through displays, coupled to the platform, wherein each see-through display of the plurality of see-through displays comprises:
      a frame;
      a controller, arranged on the frame, for receiving the display contents and transmitting a control signal according to the display contents; and
      a lens, arranged on the frame, for displaying the display contents according to the control signal, comprising:
         a front side, wherein the display contents is displayed on the front side, allowing passersby to see the display contents; and
         a back side, wherein ambient light transmits through the lens, allowing a user to see surroundings from the back side.

2. The user interaction system of claim 1, wherein the platform further comprises a user interface, for receiving a first request signal input by the user, and the first request signal is used to request the display contents.

3. The user interaction system of claim 2, wherein the processor determines whether to transmit the display contents to the plurality of see-through displays in response to whether the first request signal is approved.

4. The user interaction system of claim 1, wherein the platform transmits a second request signal to the plurality of see-through displays and determines whether to transmit the display contents to the plurality of see-through displays in response to whether the second request signal is approved by the controller of each see-through display or the user.

5. A platform, for a plurality of see-through displays, comprising:
   a memory, for storing display contents; and
   a processor, for transmitting the display contents to a plurality of see-through displays;
   wherein each see-through display of the plurality of see-through displays comprises:
      a frame;
      a controller, arranged on the frame, for receiving the display contents and transmitting a control signal according to the display contents; and
      a lens, arranged on the frame, for displaying the display contents according to the control signal, comprising:
         a front side, wherein the display contents is displayed on the front side, allowing passersby to see the display contents; and
         a back side, wherein ambient light transmits through the lens, allowing a user to see their surroundings from the back side.

6. The platform of claim 5, further comprising a user interface, for receiving a first request signal input by the user, and the first request signal is used to request the display contents.

7. The platform of claim 6, wherein the processor determines whether to transmit the display contents to the plurality of see-through displays in response to whether the first request signal is approved.

8. The platform of claim 5, wherein the processor transmits a second request signal to the plurality of see-through displays and determines whether to transmit the display contents to the plurality of see-through displays in response to whether the second request signal is approved by the controller of each see-through display or the user.

9. A see-through display, for displaying display contents received from a platform, comprising:
- a frame;
- a controller, arranged on the frame, for receiving the display contents and transmitting a control signal according to the display contents; and
- a lens, arranged on the frame, for displaying the display contents according to the control signal, comprising:
    - a front side, wherein the display contents is displayed on the front side, allowing passersby to see the display contents; and
    - a back side, wherein ambient light transmits through the lens, allowing a user to see their surroundings from the back side.

* * * * *